(12) United States Patent
Ferren et al.

(10) Patent No.: US 9,363,571 B2
(45) Date of Patent: Jun. 7, 2016

(54) TOUCH SENSING APPARATUS AND METHOD

(75) Inventors: Bran Ferren, Beverly Hills, CA (US); Dimitri Negroponte, Los Angeles, CA (US); Cory J. Booth, Beaverton, OR (US); Genevieve Bell, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 150 days.

(21) Appl. No.: 13/819,285

(22) PCT Filed: Aug. 25, 2011

(86) PCT No.: PCT/US2011/049203
§ 371 (c)(1),
(2), (4) Date: Aug. 20, 2013

(87) PCT Pub. No.: WO2012/027599
PCT Pub. Date: Mar. 1, 2012

(65) Prior Publication Data
US 2013/0335349 A1 Dec. 19, 2013

Related U.S. Application Data

(60) Provisional application No. 61/377,588, filed on Aug. 27, 2010.

(51) Int. Cl.
*G06F 3/041* (2006.01)
*H04N 21/63* (2011.01)
(Continued)

(52) U.S. Cl.
CPC ............... *H04N 21/632* (2013.01); *G01S 5/20* (2013.01); *G06F 3/017* (2013.01); *G06F 3/0346* (2013.01); *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0485* (2013.01); *G06K 9/3266* (2013.01); *G06N 5/02* (2013.01); *G06Q 30/0201* (2013.01); *G08C 17/00* (2013.01);
(Continued)

(58) Field of Classification Search
None
See application file for complete search history.

(56) References Cited

U.S. PATENT DOCUMENTS 7,982,721 B2 7/2011 Hio
8,648,816 B2 * 2/2014 Homma et al. ............... 345/173
(Continued)

FOREIGN PATENT DOCUMENTS

JP H7-302159 11/1995
JP 2003-519864 6/2003
(Continued)

OTHER PUBLICATIONS

Office Action received for Japanese Patent Application No. 2013526159, mailed Apr. 1, 2014, 8 pages including 4 pages English translation.
(Continued)

*Primary Examiner* — Joseph Haley

(57) ABSTRACT

An apparatus may include a processor and a touch sensing device coupled to the processor. The apparatus may further include a force determining module operative on the processor to receive a detection signal from a first portion of the touch sensing device, determine a contact area at the first portion based upon the detection signal, map the first portion to a target operation, and send control instructions to perform the target operation based on the contact area.

24 Claims, 14 Drawing Sheets

(51) Int. Cl.

| | | |
|---|---|---|
| H04N 21/437 | (2011.01) | |
| G06K 9/32 | (2006.01) | |
| H04N 5/445 | (2011.01) | |
| H04N 21/431 | (2011.01) | |
| H04N 21/654 | (2011.01) | |
| G08C 17/00 | (2006.01) | |
| G08C 17/02 | (2006.01) | |
| G08C 19/00 | (2006.01) | |
| G06F 3/048 | (2013.01) | |
| G06N 5/02 | (2006.01) | |
| G01S 5/20 | (2006.01) | |
| H04N 21/45 | (2011.01) | |
| H04N 21/488 | (2011.01) | |
| H04N 5/91 | (2006.01) | |
| H04N 5/44 | (2011.01) | |
| G06F 3/0485 | (2013.01) | |
| H04L 29/06 | (2006.01) | |
| G06Q 30/02 | (2012.01) | |
| H04N 21/436 | (2011.01) | |
| H04N 21/422 | (2011.01) | |
| H04N 21/443 | (2011.01) | |
| G06F 3/01 | (2006.01) | |
| G06F 3/038 | (2013.01) | |
| G06F 3/0482 | (2013.01) | |
| G06F 3/0481 | (2013.01) | |
| H04N 21/482 | (2011.01) | |
| G06F 3/0346 | (2013.01) | |
| H04N 21/4147 | (2011.01) | |
| H04N 21/433 | (2011.01) | |
| H04N 21/81 | (2011.01) | |
| H04N 21/475 | (2011.01) | |

(52) U.S. Cl.
CPC ............. *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *H04N 21/4755* (2013.01); *H04N 21/8133* (2013.01); *H04N 2005/44556* (2013.01)

(56) References Cited

U.S. PATENT DOCUMENTS

| | | | |
|---|---|---|---|
| 2003/0043174 A1 | 3/2003 | Hinckley et al. | |
| 2006/0284858 A1 | 12/2006 | Rekimoto | |
| 2008/0094367 A1* | 4/2008 | Van De Ven et al. | 345/173 |
| 2008/0105470 A1* | 5/2008 | Van De Ven et al. | 178/18.01 |
| 2010/0039393 A1* | 2/2010 | Pratt et al. | 345/173 |
| 2010/0053107 A1 | 3/2010 | Tsuzaki et al. | |
| 2010/0079395 A1* | 4/2010 | Kim et al. | 345/173 |
| 2010/0127997 A1 | 5/2010 | Park et al. | |
| 2011/0050630 A1* | 3/2011 | Ikeda | 345/174 |

FOREIGN PATENT DOCUMENTS

| | | |
|---|---|---|
| JP | 2006-345209 | 12/2006 |
| JP | 2008-191791 | 8/2008 |
| JP | 2009-237875 | 10/2009 |
| JP | 2010-028364 | 2/2010 |
| JP | 2010-113445 | 5/2010 |
| KR | 10-2006-0084945 | 7/2006 |

OTHER PUBLICATIONS

International Search Report and Written Opinion received for PCT Patent Application No. PCT/US2011/049203, mailed Feb. 17, 2012, 8 pages.

Extended European Search Report received for European patent Application No. 11820671.3, mailed Feb. 5, 2015, 9 pages.

* cited by examiner

TOUCH SENSING APPARATUS AND METHOD

RELATED APPLICATIONS

This application claims priority to U.S. Provisional Patent Application Ser. No. 61/377,588 filed Aug. 27, 2010, which is incorporated herein by reference in its entirety.

BACKGROUND

The use of touch sensitive devices has exploded in recent years in part driven by consumer market including smart phone, video games, tablet computer, and related computing and communication devices. Many alternative approaches have been employed to produce products, such as touch screens in which a display (the touch screen) serves as a direct user interface. These approaches include resistive touch screens, surface acoustic wave based touch screens, infrared based touch screens, and various types of capacitive touch screens. A hallmark of touchscreens is the ability to sense the presence of touch and its location within a display area (touch screen area). This facilitates the ability of a system to interpret a user input based upon its location on a touch screen. Thus, a user's fingers or other devices may be used to select fields, icons, text, or other objects displayed on the touch screen similarly to the use of electronic devices such as a computer mouse.

Although touch screens provide a direct interface between user and a display, variables such as contamination, the type of touch screen, the size of icons, and other factors may influence the reliability. For example, a user may touch a selection presented on a screen of an electronic device without engendering an expected response by the device. The user may continue to press the selection using excessive force still without success, unaware that the use of additional force may be unlikely to produce the desired response.

It is with respect to these and other considerations that the present improvements have been needed.

DETAILED DESCRIPTION

Figure 1:
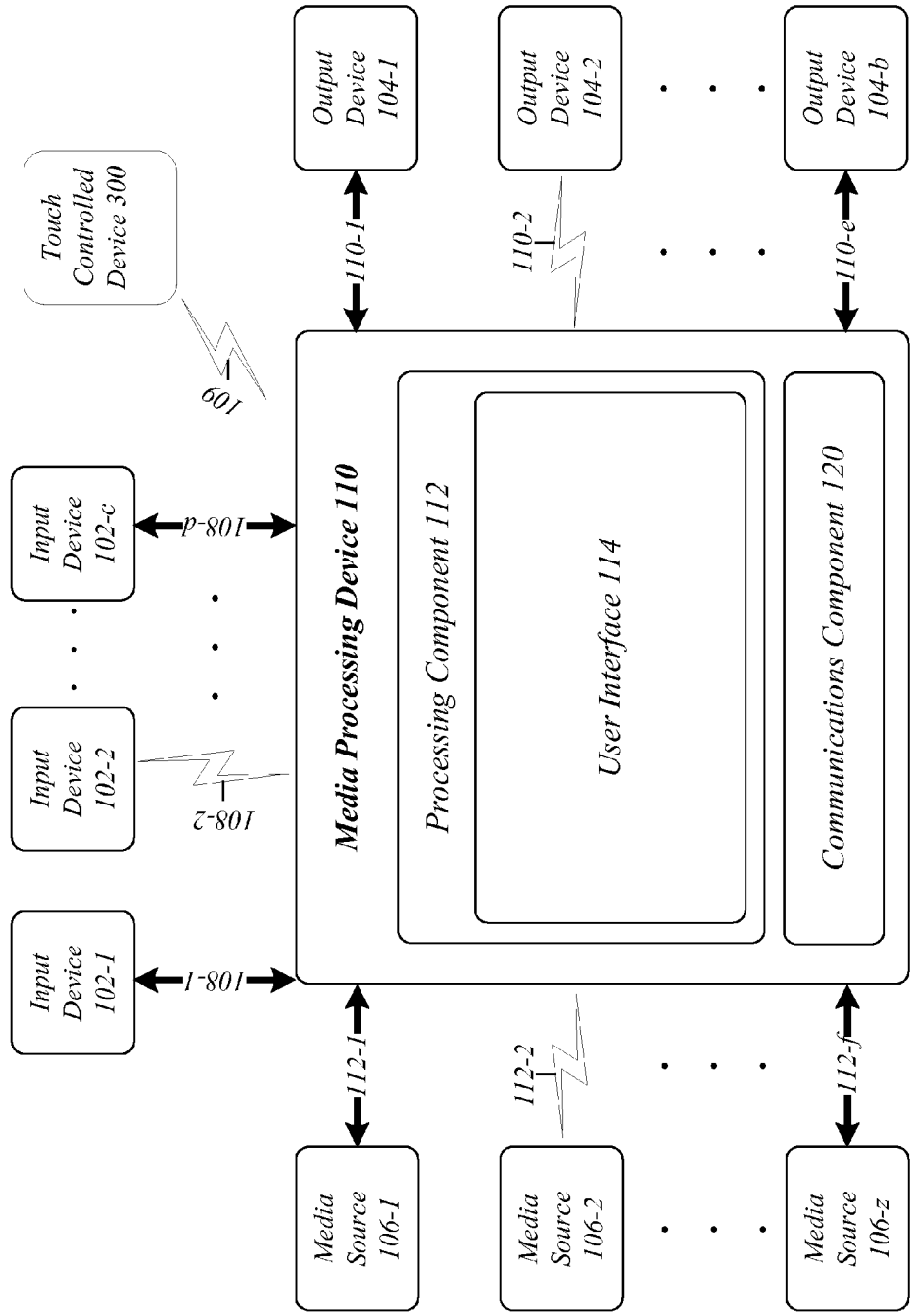
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to remote control devices that have substantially different shape and geometry relative to conventional remote controls. In some embodiments a remote control device (also termed "remote control" herein) may have a generally spherical shape while in other embodiments a remote control device may have a polyhedral shape, such as a cube shape. As detailed below, user interaction with remote control devices arranged according to the present embodiments may be substantially different than with known remote controls because of different shapes, different user interfaces, and sensors provided by remote controls of the present embodiments. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, and one or more media sources 106-c. The media processing device 110 may be communicatively coupled to the input devices 102-a, the output devices 104-b, and the media sources 106-c via respective wireless or wired communications connections 108-d, 110-e and 112-f.

It is worthy to note that "a" and "b" and "c" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. In some embodiments, a touch controlled device 300 may be coupled to media processing device 110 over a link 109. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more of output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720 p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise a user interface. User interface 114 is shown as part of media processing device 110 for purposes of illustration and not limitation. It should be understood that user interface could be located in other devices, components or nodes of media processing system 100 in various embodiments and still fall within the described embodiments.

Figure 2:
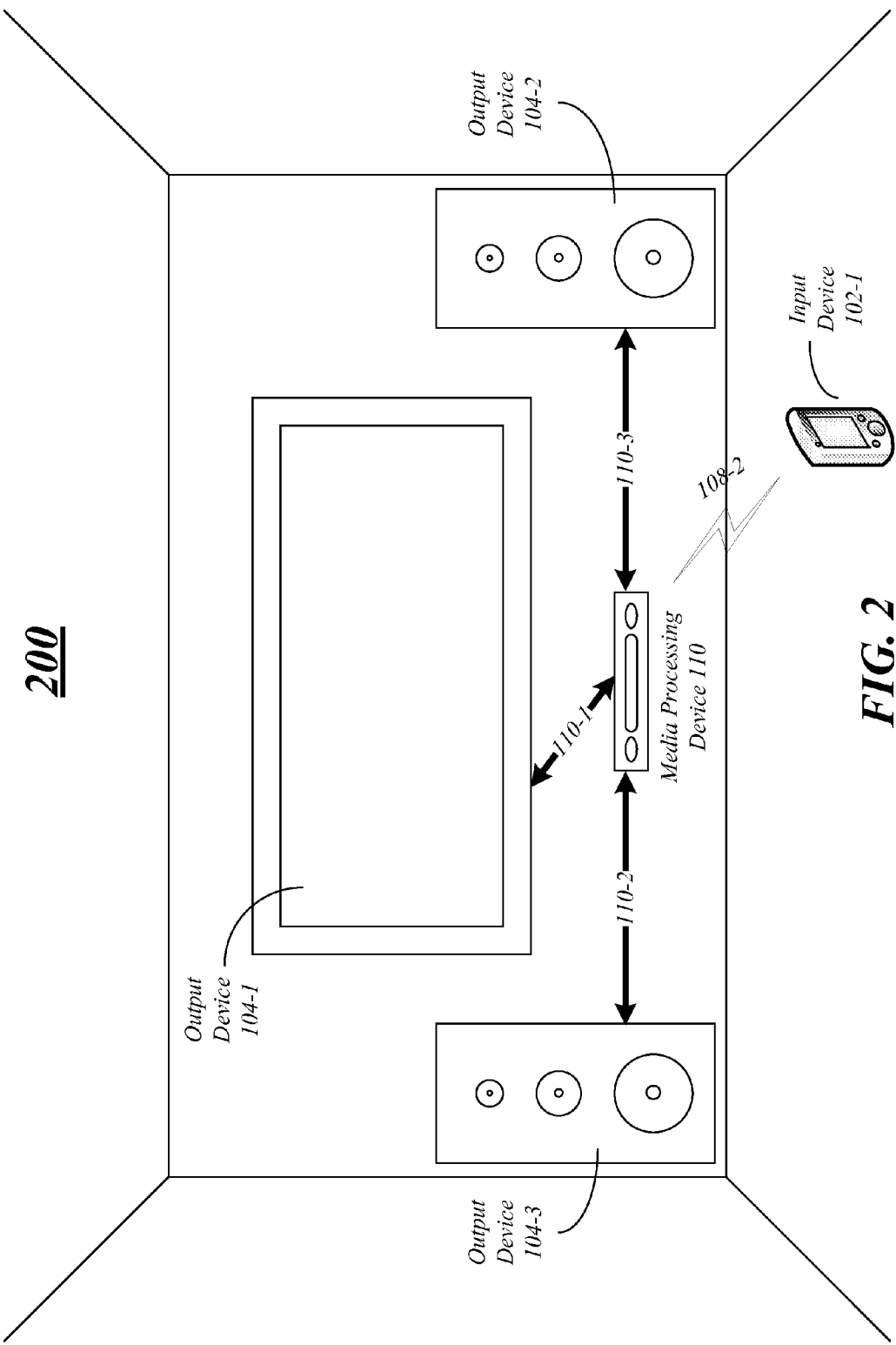
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Various embodiments are described herein provide apparatus and systems that determine area of contact (contact area) between a touch sensitive interface and an external agent, such as a user's finger or hand. In particular, the terms "area of contact" and "contact area" as used herein, generally refer to the value of two dimensional surface area where a user contacts the touch sensitive interface, and generally does not refer to a location on the touch sensitive interface. The determined contact area may be used as a proxy to infer a degree of force intended by the user for performing an operation provided by the apparatus. In various embodiments, the control of the level of "force" inferred from the size of the contact area may be used to control specified operations, including varying the rate at which the operations are performed. The present embodiments may therefore provide to a user a more intuitive control of a selected operation by translating the amount of user contact with an interface into a degree of response of a controlled operation or function. In some embodiments, the contact area measurements may be supplemented with physical force measurements that may be provided by a load cell.

The present embodiments may include various electronic apparatus that have a user interface that includes a device that detects signals based upon touch. Examples of such devices include touch screens and touch pads and are generally referred to herein as a "touch sensing device." Examples of electronic apparatus that may contain a touch sensing device include a remote control, a touch screen computer, a personal digital assistant, a cellular telephone, smart phone, a videogame player, an audio player, a home appliance, digital music device, and a display coupled to other devices. Each of these apparatus may employ a touch sensing device to control one or more functions in the apparatus or in a separate apparatus linked to the apparatus containing the touch sensing device. Accordingly, the term "touch controlled device" is used herein to refer to such apparatus when the apparatus includes a touch sensing device.

Figures 3A, 3B:
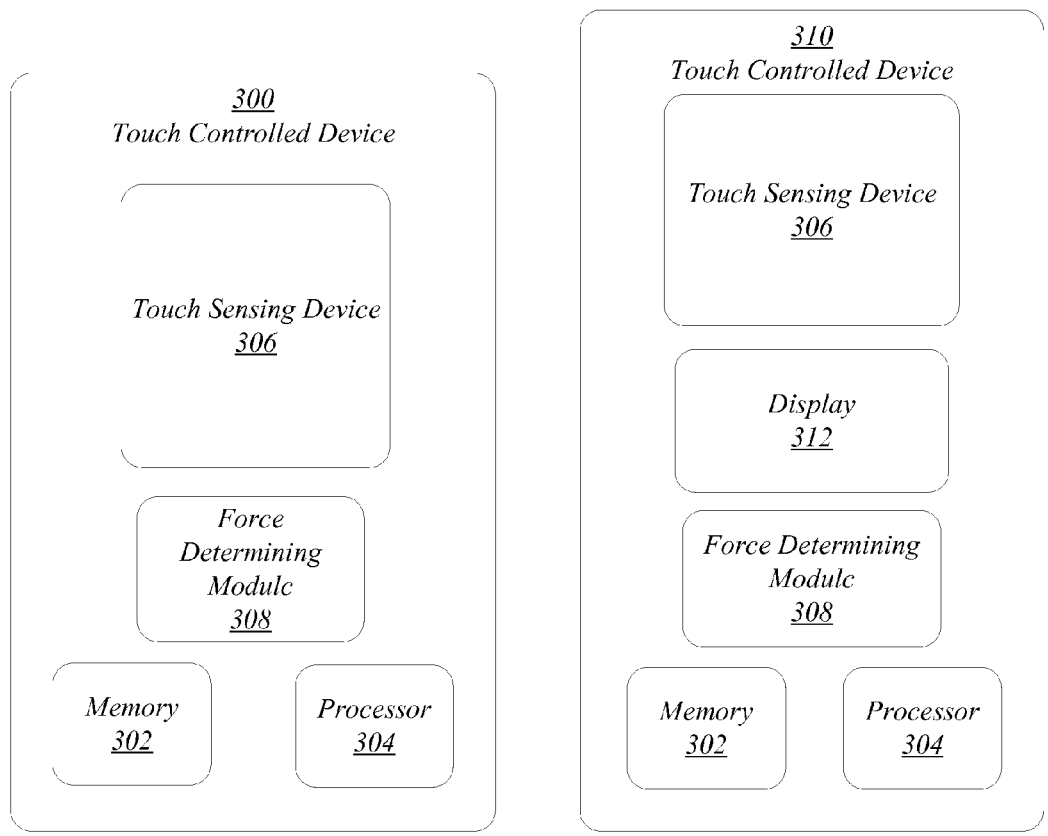
FIG. 3a depicts of an embodiment of a touch controlled device.
FIG. 3b depicts another embodiment of a touch controlled device.

FIG. 3a depicts exemplary features of an embodiment of a touch controlled device 300. The touch controlled device 300 may include a memory 320, processor 304, and touch sensing device 306. In some embodiments, touch sensing device 306 may be a touch screen, while in other embodiments touch sensing device may be a touch pad or a combination of touch screen and touch pad. As described in more detail below, touch screen embodiments of touch sensing device 306 may include, but are not limited to, a surface acoustic wave (SAW) device, an optically controlled touch screen, a capacitively controlled touch screen, an infrared controlled touch screen, and other devices. Various embodiments of a touch pad include, but are not limited to, a capacitive touch pad and a resistive touch pad. Touch controlled device 300 may also include a force determining module 308, which may act to control operations of one or more devices based upon user contact with touch sensing device 306, as discussed below.

FIG. 3b depicts an embodiment of a touch controlled device 310, in which a digital display 312 is provided in addition to the touch sensing device 306. In one example, digital display 312 may be a conventional display that is not touch sensitive, and touch sensing device may be a touch pad.

Figure 3C:
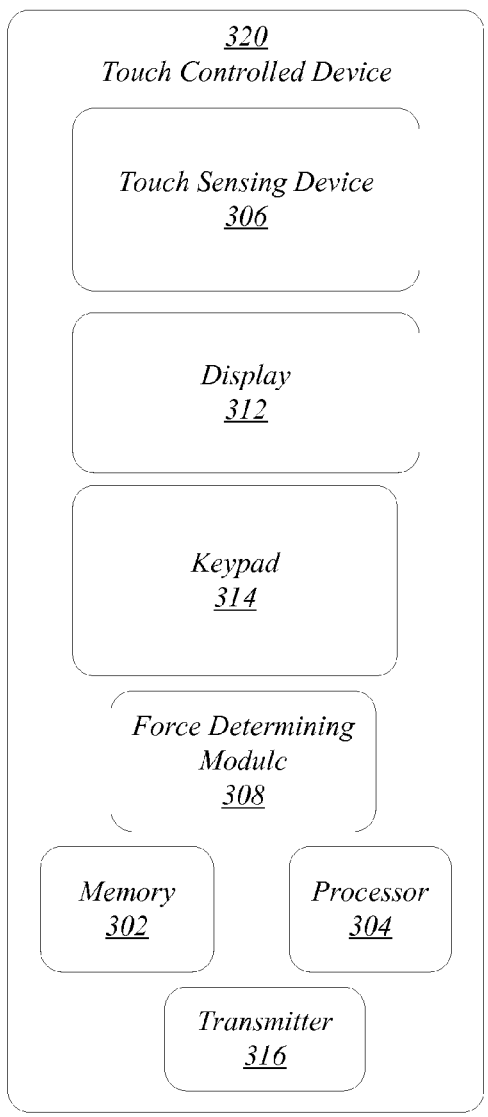
FIG. 3c depicts a further embodiment of a touch controlled device.

FIG. 3c depicts a further embodiment of a touch controlled device 320 that includes a keypad 314 and transmitter 316. In various embodiments, the touch controlled device 320 may include remote control functions that can be executed using touch sensing device 306 and/or keypad 314 to direct operations of an external device, as discussed in more detail below with respect to FIG. 4. In some embodiments, touch controlled device 320 may employ transmitter 316 to send control signals via infrared or radio frequency radiation.

Figure 3D:
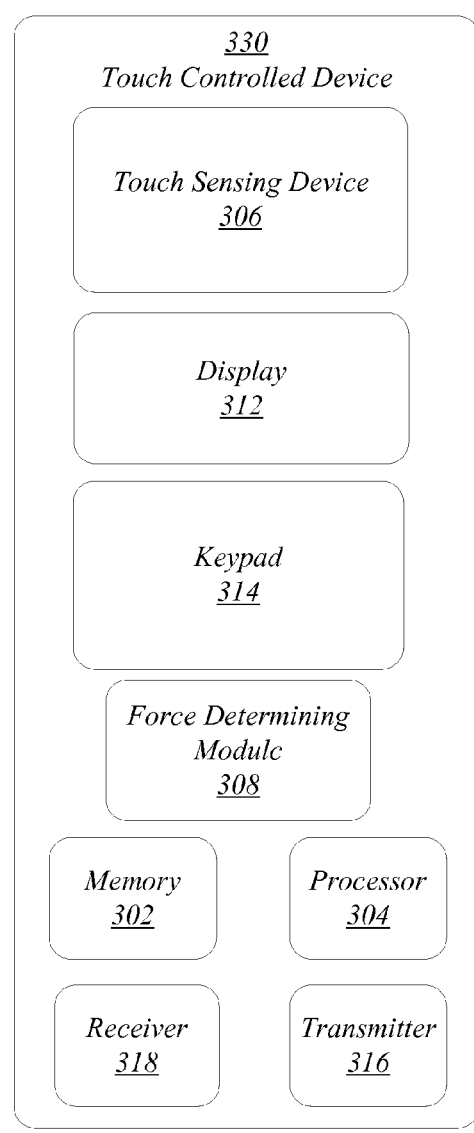
FIG. 3d illustrates still another embodiment of a touch controlled device.

FIG. 3d illustrates still another embodiment of a touch controlled device 330 that includes a receiver 318. In some embodiments, touch controlled device may be a remote control, cellular telephone, smart phone, tablet computer, or similar device that is capable of transmitting and receiving wireless communications. In various embodiments of the devices generally depicted in FIGS. 3a-3d, multiple components that are depicted separately may be incorporated within a single component. For example, in touch controlled device 330, a single touch screen may include the touch sensing device 306, digital display 312, and (virtual) keypad 314.

In some embodiments, processor 304 may be arranged in conjunction with the touch sensing device 306 to control operations of components that are part of a touch controlled device that houses the touch sensing device 306. For example, the processor 304 and touch sensing device 306 may function to control scrolling rate of items presented on digital display 312 of touch controlled devices 320, 330. In various other embodiments processor 304 and touch sensing device 306 may together control operations of devices or apparatus external to a touch controlled device.

In some embodiments, touch sensing device 306 may comprise one or more sensors that are arranged to produce signals that trigger target operations when user contact with the touch sensing device 306 is detected. The touch sensing device 306 may present a two dimensional surface to a user, similar to known touch screen or touch pad devices. As illustrated in FIG. 3a, the touch sensing device 306 may include one or more touch sensitive regions that are capable of detecting contact. In various embodiments, touch sensing device 306 may be arranged to detect that contact has been made (a "contact event") when a user manually contacts or comes into close proximity with touch sensing device 306 or causes an object to contact or approach touch sensing device 306. For example, in embodiments of a capacitive touch sensing device, a contact event may be deemed to have occurred once a threshold change in capacitance is detected. This threshold capacitance change may be met when a user's hand or finger contacts the surface or is very near the surface of touch sensing device 306. Likewise, in embodiments of a touch sensing device 306 that employ optical or infrared sensing, a contact event may be determined when a user's hand or other object is brought proximate the touch sensing device 306.

In addition to detecting the occurrence of a contact event, force determining module 308 may be operative on processor 304 to determine the contact area associated with a contact event. Force determining module 308 may be wholly or partially included within processor 304 or memory 302 or may be distributed among multiple components. In different embodiments, force determining module 308 may use the location and contact area of a contact event determined by the force determining module, in order to control one of a number of different operations or functions. These operations or functions may include those that can be performed by the touch controlled device or by an external device (not shown) that is coupled to a touch controlled device. In various embodiments, the force determining module 308 may be operable on processor 304 to provide instructions for executing (performing) a target operation at a rate that is proportional to the determined contact area. By setting the rate of an operation to be proportional to the contact area, the force determining module 308 may provide an intuitive feedback to a user for more facile control of various operations. Since the application of varying force at a fingertip or similar agent is known substantially change the contact area when a user applies additional force, a target operation may be performed more rapidly. Moreover, user actions that do not necessarily increase force on a touch controlled device may be employed to control the rate of performing a target operation. Thus, a user may simply rotate a finger while pressed against a touch sensing device 306 in order to increase contact area and thereby yield a faster performance of a target operation.

In various embodiments the touch sensing device 306 may be arranged to output an "x" and "y" position of a contact event within a two-dimensional orthogonal coordinate system that specifies location within the touch sensing device. In various embodiments, the force determining module 308 may produce a set of scalar factors for any given contact event that include an "x" and "y" position of the detected contact event within touch sensing device 306. These "x-y" scalar values may be used to map the contact event to a target operation, that is, an operation to be controlled using the touch controlled device. For example, at a given instance the force determining module 308 may be arranged to link specific regions, which are defined by an "x" and "y" values, to a specific function or operation. Thus, the "x-y" position of a detected contact event may be used to trigger a target operation specified by that position. In addition, the force determining module 308 may produce a "z" scalar quantity that represents the value (magnitude) of the determined contact area and is used to control the rate at which the target operation is performed.

In various embodiments, these target operations may include operations performed on a touch controlled device, such as scrolling and zooming functions. In other embodiments, these controlled operations may include operations performed in devices coupled to the touch controlled device through one or multiple links.

Figure 4:
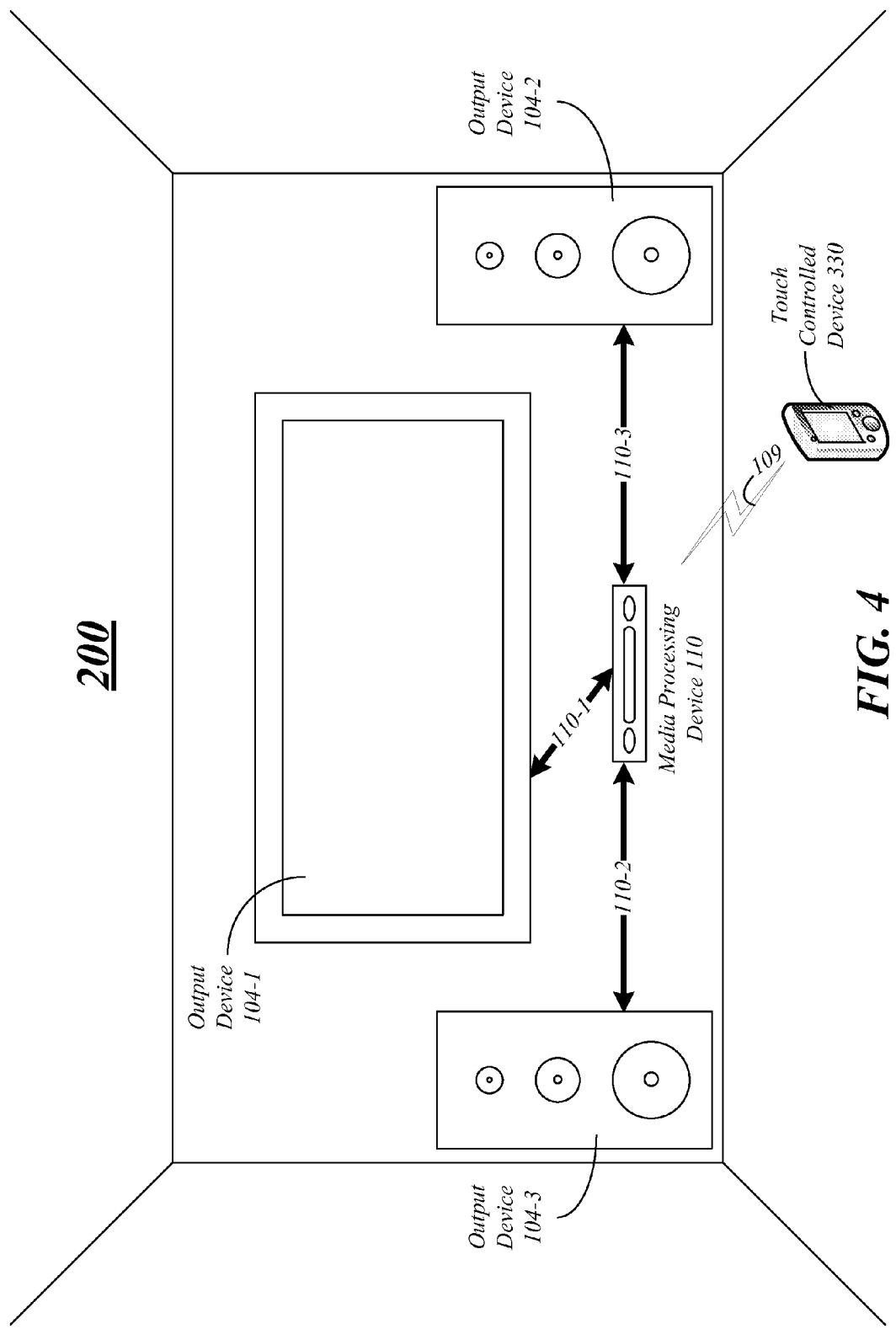
FIG. 4 depicts another embodiment of a media processing system.

FIG. 4 depicts one embodiment of a media processing system 200, in which touch controlled device 330 is wirelessly coupled to media processing device 110 using link 109. In various embodiments, using wireless link 109, the touch controlled device 330 may act as a remote control to control operations of devices that are linked to media processing device 110. For example, referring also to FIG. 3d, during a given contact event a user may contact a specific region of the touch sensing device 306. Force determining module 308 may determine a location of the specific region and map this to a target operation. If the operation is an operation performed by a device external to touch controlled device 330, the force determining module 308 may be operable on processor 304 to provide instructions concerning the particular operation for forwarding to transmitter 316. These instructions may be forwarded to an external device and used to control a target operation to be performed in the external device, such that the target operation is performed at a rate that is proportional to the contact area of the contact event.

Figure 5A:
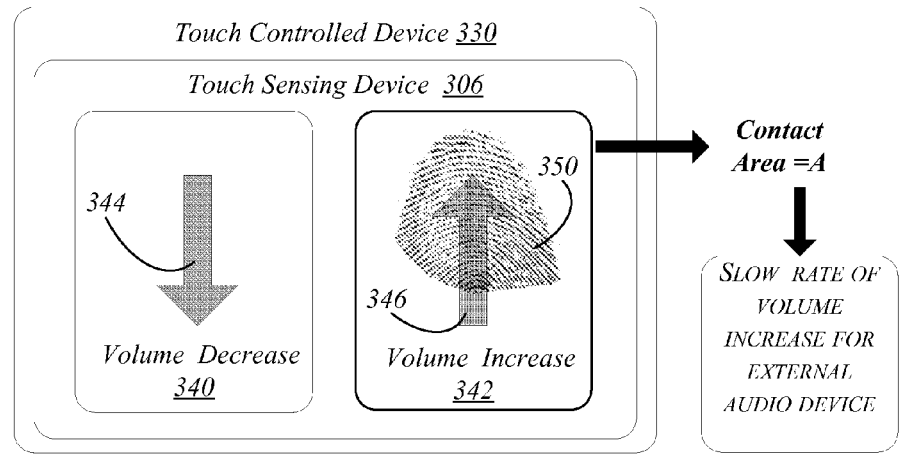
FIGS. 5a-5c depict one embodiment of using a touch sensing device to control audio volume.
Figure 5B:
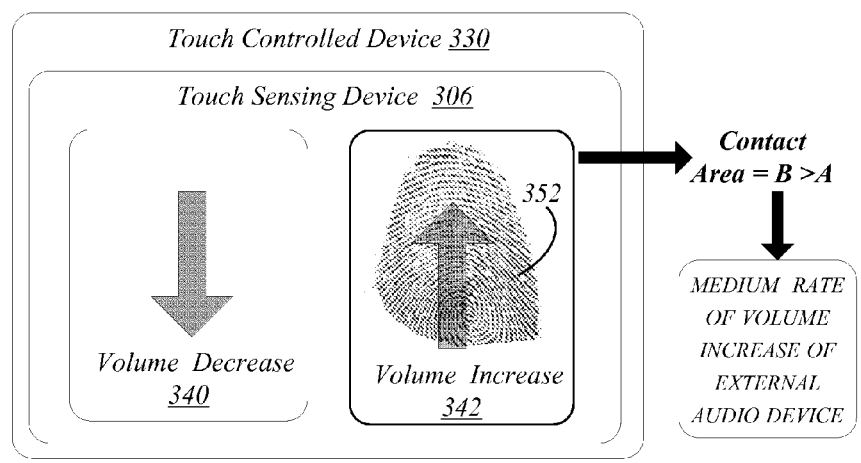
Figure 5C:
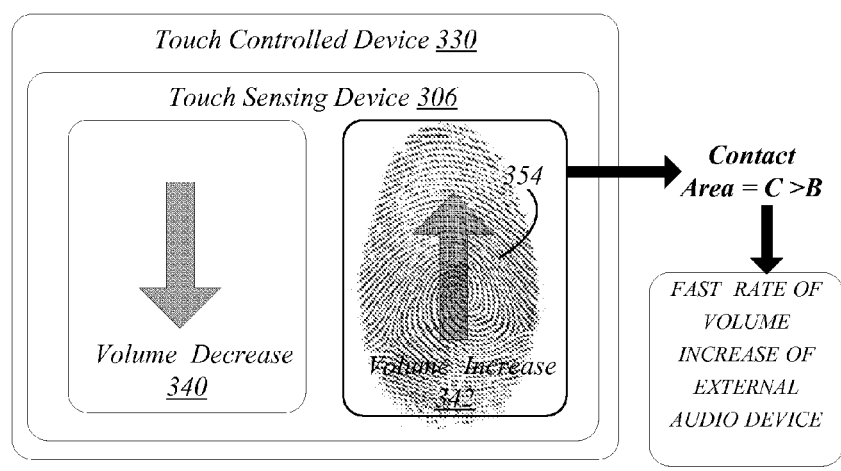

In one embodiment, the touch controlled device 330 may control the audio volume of output devices 104-2, 104-3, which may be audio speakers that are coupled to media processing device 110. The touch controlled device 330 may further control how rapidly audio volume output by devices 104-2, 104-3 increases or decreases. FIGS. 5a-5c depict one embodiment of using a touch sensing device to control the audio volume and the rate of changes in audio volume. In particular, variations in contact area in a touch sensing device are used to vary the rate of changing of audio volume of the output device. The touch sensing device 306 of FIGS. 5a-5c may be a touch screen in some embodiments. The touch sensing device includes a region 340 and a region 342, which display a "volume down" icon (downwardly pointing arrow) 344 and "volume up" icon (upwardly pointing arrow) 346, respectively. In some embodiments, the regions may be touch screen regions and icons 344 and 346 may be created by a software application for display on touch sensing device 306.

The touch controlled device 330 may be arranged so that when a user contacts region 340 while the "volume down" icon 344 is visible in touch sensing device 306, the touch controlled device 330 directs signals to decrease the volume in an audio output device. Similarly, when a user contacts region 342 while the "volume up" icon 346 is visible in touch sensing device 306, the touch controlled device 330 directs signals to increase the volume in an audio output device, such as output devices 104-2, 104-3. In one example, referring also to FIG. 3d, if touch sensing device 306 detects a contact event in region 340 while "volume down" icon 344 is visible, instructions may be sent to a transmitter 316 to transmit a wireless signal to media processing device 110, which produces an audio control signal that causes audio volume of output devices 104-2, 104-3 to decrease.

In the particular example illustrated in FIG. 5a, when a user's fingertip contacts region 342, a portion of the fingertip may be in contact with region 342, as illustrated by portion 350. The depiction of portion 350 as a fingerprint is meant to schematically suggest a position and size of a region of contact between a user's finger and the region 342 of a touch sensing device, but is not meant to suggest that the contact event creates a visible image. If the portion 350 where contact takes place produces a sufficient signal, the touch sensing device 306 may accordingly detect that a contact event has occurred, which then triggers an increase in audio volume in output devices 104-2, 104-3 at a certain rate (termed "slow rate" in the FIG. 5a.). In various embodiments, the position and area of a contact event may be determined using one or more sensors positioned proximate the surface of a touch sensing device 306. For example, in some embodiments touch sensing device 306 may include an outer touch surface that is contacted by a user and a sensor or sensors that are positioned either above or below the touch surface.

Figure 6B:
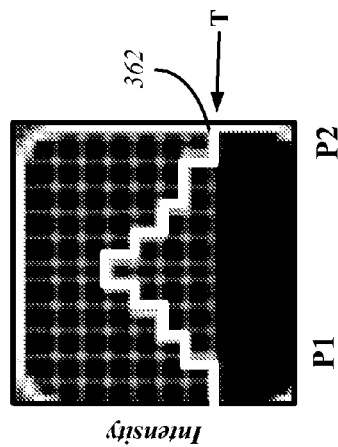
FIGS. 6a-6d depict an embodiment of contact area determination.
Figure 6A:
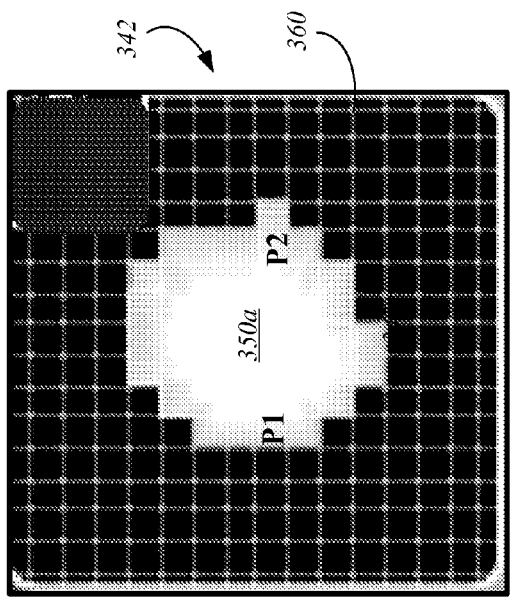
Figure 6D:
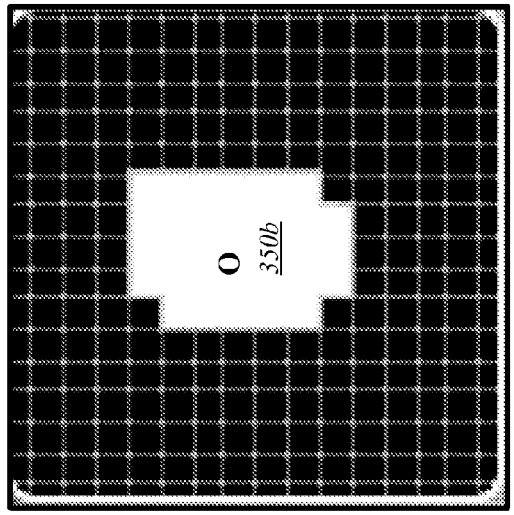
Figure 6C:
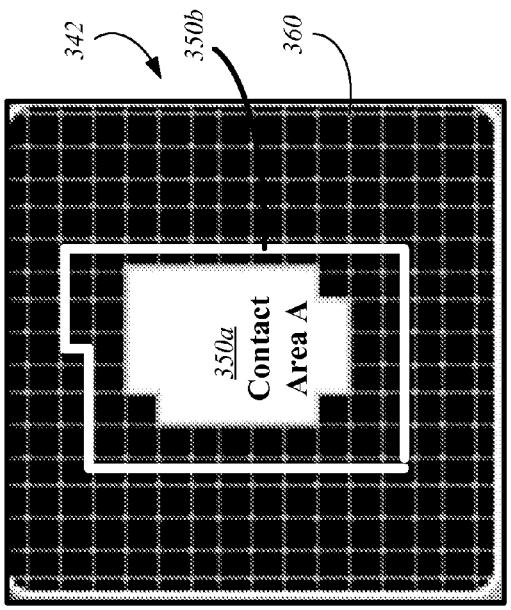

In some embodiments, a two dimensional array of sensors may be arranged beneath the surface of the touch sensing device 306, that is, within a housing of the touch controlled device 330. FIGS. 6a-6d depict an embodiment of contact area determination using region 342 of touch sensing device 306. Illustrated in FIG. 6a is a two dimensional sensor array 360 that may disposed within the area defined by region 342 and may be located beneath an outer surface (which is not shown for clarity) of touch sensing device 306. When a user device such as the user's finger is brought proximate to the outer surface or in contact with the outer surface of region 342 the sensor array 360 detects signals at various points within the sensor array 360. This is illustrated as a raw image 350a produced by the user's fingertip that represents the pattern of points within the sensor array 360 where signals, or changes in signals, are detected. The shape and size of raw image 350a may roughly correspond to the shape and size of portion 350, which represents the portion of the outer surface of region 342 that is contacted. The detected signal intensity at different points may be compared to a reference threshold level T, to determine if a signal at any given point is to be interpreted as representing an actual contact event. As shown in FIG. 6b, which plots signal intensity along a line between points P1 and P2, the signal intensity may be above the threshold T for many points in the sensor array 360. An image 350a, illustrated in FIG. 6c, may be generated for those points at which the signal intensity is above the threshold T. From this image 350a, a contact area A shown in FIG. 5a may be determined. In addition, as depicted in FIG. 6d, a position O of the contact event may be determined based upon the pattern of points in sensor array 360 report signal intensity above a threshold T.

In other embodiments, the contact area A for a portion 350 may be determined by other known methods. By whatever method the contact area is calculated, the position of the contact event that gives rise to the determined contact area A may then be mapped to a given target function or target operation to be controlled, such as the rate of increase of audio volume in an output device. For example, force determining module 308 may include a program, algorithm, or macro operable on processor 304 that maps events detected in region 342 to audio volume increase rate. Processor 304 may then calculate a first rate of increase in volume corresponding to contact area A, and send instructions to transmitter 316 to transmit a wireless control signal to media processing device 110 setting the rate of volume increase.

If the user subsequently increases the size of the contacted portion, for example, by rotating a finger or pressing down with more force, the force determining module 308 may act to raise the rate of audio volume increase. FIG. 5b depicts such a scenario in which a user's fingertip contacts a larger portion 352 of region 342. The force determining module 308 may be operable upon processor 304 to receive signals from touch sensing device 306 that are triggered by the increase in size from the contact portion 350 to portion 352. For example, referring again to FIG. 6c, a second image 350b may be generated that delineates the pattern of points in a sensor array at which the signal intensity is above the threshold T. The signals may be processed to calculate an increase in contact area to yield a contact area B. Based upon the calculated increased contact area, the force determining module 308 may determine that contact area B is greater than contact area A. Based upon this determination the force determining module 308 may further operate to generate instructions that raise the rate of increase of audio volume (denoted in the figure as a "medium rate").

FIG. 5c depicts a further scenario in which the user's fingertip contacts an even larger portion 354 of region 342. Under this scenario, a detected contact area C is larger than both A and B, which may therefore trigger touch controlled device 330 to send instructions to adjust the rate of volume increase in output devices 104-2, 104-3 to an even higher rate.

Figure 7A:
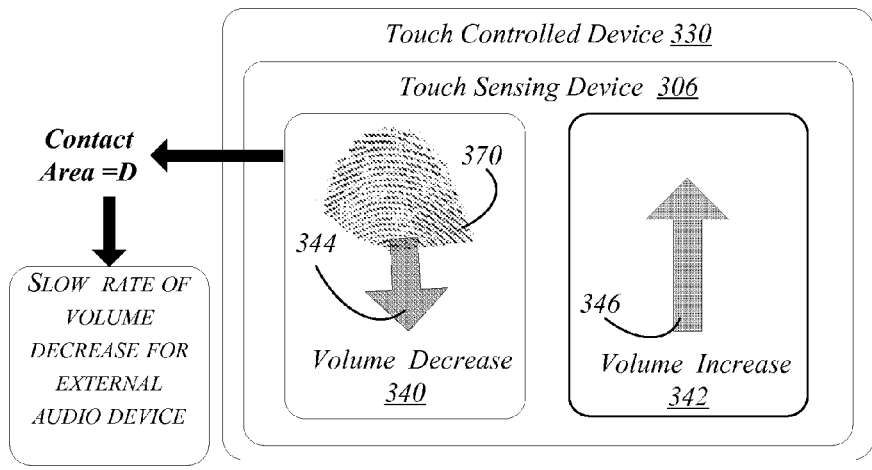
FIGS. 7a-7c depict three scenarios in which the area of contact varies.
Figure 7B:
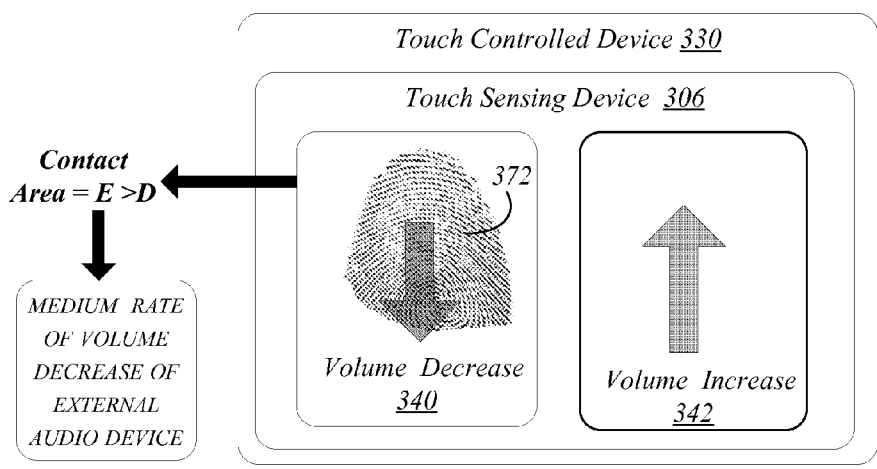
Figure 7C:
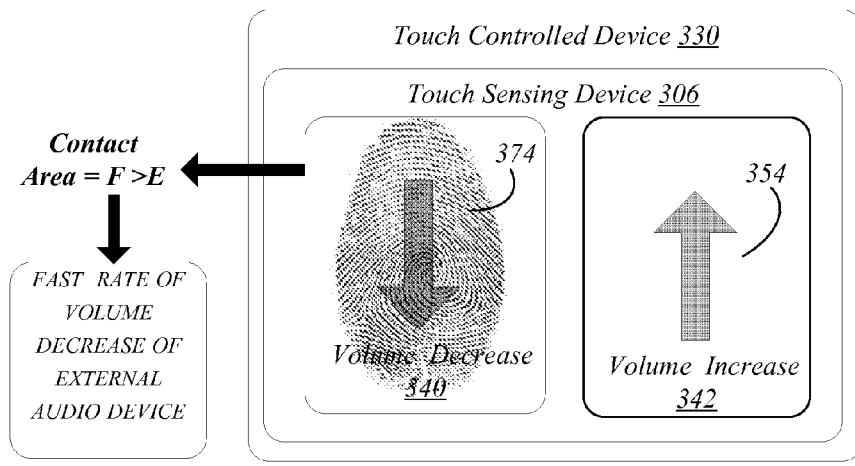

A similar set of procedures may take place when a user contacts region 340 when icon 344 is presented, indicating that a "volume decrease" function is active in that region of touch sensing device 306. FIGS. 7a-7c depict three scenarios in which the area of contact varies in region 340. In FIG. 7a, a relatively smaller portion 370 is contacted, which results in touch controlled device 330 calculating a contact area D that directs a relatively slow rate of decrease for audio volume of a controlled device linked to touch controlled device 330. In the scenario of FIG. 7b, a larger portion 372 of the region 340 is contacted by a user. From this portion 372, the touch controlled device 330 may calculate a contact area E that is larger than D, with the result that the touch controlled device 330 transmits instructions to produce a more rapid rate of volume decrease. In FIG. 7c, a still larger portion 374, from which a contact area F that is larger still than E is calculated, thereby causing a still more rapid rate of volume decrease in an audio output device.

In some embodiments, the touch controlled device may adjust the appearance of a visible icon in response to changes in contact area to reinforce that a desired change in an operation is taking place. This is illustrated in FIGS. 7a-7c, where the size of icon 344 increases in response to increased contact area, thus reinforcing to a user that the audio volume of output devices is decreasing at a more rapid pace.

As illustrated in FIGS. 5-7, the touch controlled devices of the present embodiments may perform in a manner that infers user intent by coupling the contact area to operation rate for a target operation. In other words, because many touch driven devices, such as touch screens and touch pads, are operated by a user's fingertips, a larger contact area is generally, though not always, the result of a greater manual pressure applied by the user when contacting the surface of the touch screen or touch pad. As noted, in interacting with known touch sensing devices, a user who has not been apprised of whether a given touchscreen or touch pad selection has been successfully registered may often attempt to apply greater pressure with the hope or expectation that the greater pressure will increase the likelihood of success. Therefore, the degree of pressure applied by a user to a touch surface is generally correlated with the degree of user intent that an operation be carried out in a timely fashion. Accordingly, when a user presses harder on a touch sensing device 306 of the present embodiments, an operation rate of a target operation may indeed increase. However, the present embodiments provide an additional advantage that a user need not exert actual increased physical pressure in order for a touch controlled device, such as any of touch controlled devices 300, 310, 320, or 330, to increase the rate at which an operation is performed. Rather, the touch controlled devices of the present embodiments may employ the detected physical area as a proxy for pressure so that a user need only increase the contact area to change the rate at which a desired operation is performed.

Thus, in accordance with various embodiments of a touch controlled device, a user is afforded multiple ways to control the rate of targeted operations. In one approach that emulates a conventional interaction, the user may simply press down a finger with more force on a touch sensing device arranged according to the present embodiments. This increased pressure likely may produce a larger detected contact area, which may then trigger an increase in the rate of performance of a desired operation. Another manner of increasing the contact area is to place the finger at a more glancing angle for contacting a touch pad or touch screen. This may be accomplished, for example, by performing a "finger roll" in which the tip of the finger is rotated from a more normal angle with respect to the touch screen surface to a more glancing angle. In this manner, a user may control the rate of an operation by performing a natural finger movement without having to exert excessive pressure, thereby improving the ergonomic experience when interacting with the touch screen or touch pad. Accordingly, a user may experiment with multiple ways of varying the rate of operations in order to discern the most ergonomic approach for that user.

In various embodiments, in order to account for variability in user interaction with a touch surface, both between different users and between different instances of use of a touch controlled device by the same user, the touch controlled devices 300, 310, 320, 330 may provide other procedures for correlating the detected contact area with a rate of execution of a target operation or function. In various embodiments, a baseline contact area may be determined at the time of detecting a contact event. This baseline contact area may then serve as the basis from which to control an operation by comparing the baseline contact area to a contact area that is detected at a later instance.

Figure 8A:
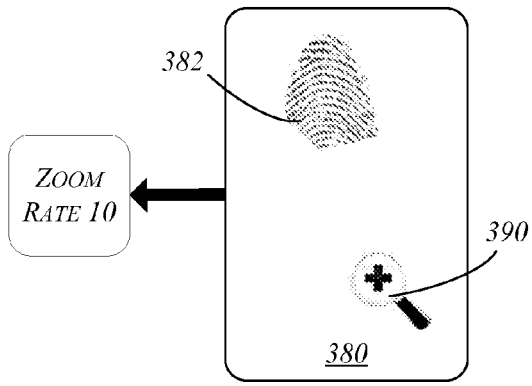
FIGS. 8a-8c depict contact scenarios on a touch sensing device.
Figure 8D:
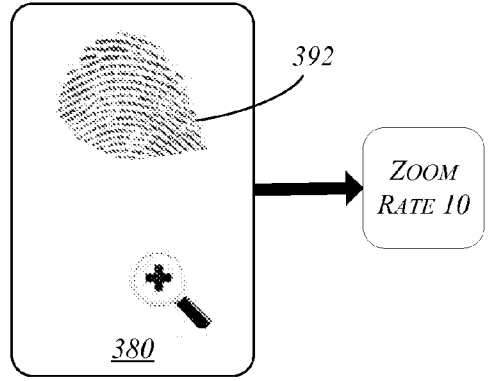
FIGS. 8d-8f depict further contact scenarios on a touch sensing device.
Figure 8B:
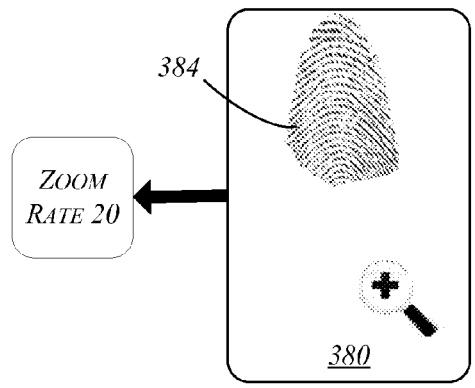
Figure 8E:
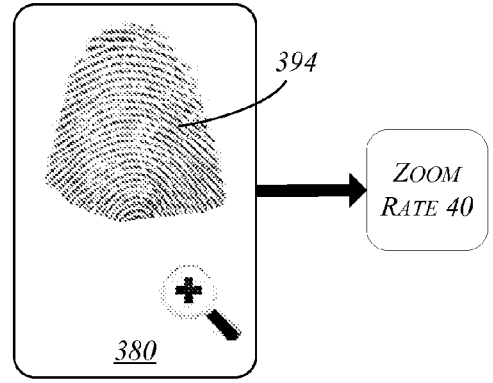
Figure 8C:
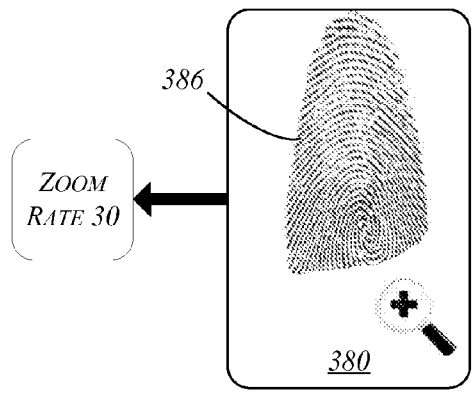
Figure 8F:
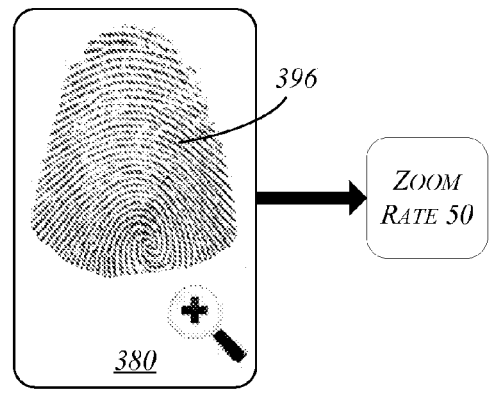

FIGS. 8a-8f depict control of a zoom function in accordance with various embodiments. A region 380 is depicted, which may form a field displayed on the surface of touch sensing device 306. Region 380 may be coupled to sensors (not shown) to detect contact area when a finger or other object is brought into contact with a touch sensing device 306 within region 380. FIGS. 8a-8c depict contact scenarios for a user finger of a first size, while FIGS. 8d-8f depict contact scenarios for a user finger of a second, larger, size.

In FIG. 8a, a portion 382 of region 380 is contacted by the smaller finger. As indicated by zoom icon 390, a touch controlled device (not shown) that contains region 380 may be arranged to provide a zoom function when a user touches region 380. At the instance depicted at FIG. 8a, a small portion of the user's fingertip is brought into contact with region 380. This may be sufficient to initiate a zoom function at a zoom rate 10 as indicated, which may cause a zoom operation to be performed on a display feature. In accordance with some embodiments, a contact area calculated from the portion 382 that is contacted in FIG. 8a, may be set as a baseline contact area. In addition, in some embodiments, the zoom rate 10 may correspond to a default zoom rate to be executed, for example, when a contact event is first detected. Accordingly, when the user subsequently increases the area of contact with region 380, as depicted by the larger portion 384 in FIG. 8b, any changes in the zoom function may take into account the initial contact area calculated from portion 382 that was contacted initially. Thus, a force control module 308 may determine a zoom rate 20 to be applied at the instance depicted in FIG. 8b that is based upon a difference in contact areas calculated using portions 382 and 384. Similarly, at another instance depicted in FIG. 8c, the portion 386 may be still larger, resulting in a zoom rate 30 being applied, which may be determined by subtracting a contact area determined from portion 382 from a contact area determined from portion 386.

In FIG. 8d, a portion 392 of region 380 is contacted by a larger finger. At the instance depicted at FIG. 8d, a small portion of the user's fingertip is brought into contact with region 380. This may be sufficient to induce a zoom rate 10 as indicated, which may cause a zoom operation to be performed on a display feature. In this case, even though the absolute contact area that is calculated from portion 392 may be larger than that calculated from portion 382, in accordance with some embodiments, the contact area calculated from the portion 392 may be set as a baseline contact area and may further be scheduled to trigger the same baseline zoom rate 10 as triggered from the smaller portion 382 produced by the smaller finger.

Thus, an initial zoom rate may be set that is at least partially independent of the absolute contact area detected. For example, once signals indicating a contact event exceed a threshold for detection, the force determining module 308 may interrogate the touch sensing device after a predetermined interval, which may be set at any value, such as zero milliseconds or 100 milliseconds after the threshold is exceeded. Thus, the force determining module 308 may establish a baseline contact area that corresponds to the contact area that is detected after 100 milliseconds. Accordingly, when the user subsequently increases the area of contact with region 380, as depicted by the larger portion 394 in FIG. 8e, any changes in the zoom function may take into account the baseline contact area calculated from portion 392 that was contacted initially. Thus, a processor may determine a zoom rate 40 to be applied at the instance depicted in FIG. 8e, based upon a difference in contact areas calculated using portions 392 and 394. In some cases this zoom rate 40 may be similar to the zoom rate 20 produced by the much smaller portion 384. Similarly, at another instance depicted in FIG. 8f, the portion 396 may be still larger, resulting in a zoom rate 50 being applied, which may be determined by subtracting a contact area determined from portion 392 from a contact area determined from portion 396. Again, zoom rate 50 may be similar to the zoom rate 30 even though the portion 396 is larger than the portion 386.

In other embodiments, the rate of change of a controlled operation or function may be based upon the ratio of contact areas calculated at different instances. Thus, at a first instance when a user contacts a touch screen with a tip of the finger, a calculated contact area may yield a first zoom rate. When the user increases the contact area, subsequent changes in zoom rate may be based upon the ratio of the subsequent contact area to the initial contact area, instead of other embodiments in which the changes in zoom rate may be based upon the difference in contact areas. In other embodiments, other functions are possible to map the determined contact area to a change in a given operation.

In various embodiments, a touch controlled device may be arranged to determine when and where a contact event begins and ends according to different procedures. In some cases, when a touch sensing device detects a contact event in a first portion of the touch sensing device, any contact detected in other portions of the touch sensing device may be deemed as part of the same contact event if the other portions are contiguous to the first portion and there is continuity in time between detection in each different portion. In this manner, a touch controlled device can determine that a user is attempting to increase the contact area for a single controlled function, rather than attempting to initiate two different functions that are linked to different portions of the touch screen.

In addition, once a contact event has been detected, in accordance with various embodiment, a user may either increase or decrease a rate of execution of an operation by either increasing or decreasing the contact area between the user's fingertip and surface of the touch sensing device. Thus, while channel surfing, a user may rotate a finger downwardly towards a more glancing angle with respect to a touch sensing device surface to speed up the rate of channel change. When the user approaches a range of interest, the user may rotate a finger upwardly towards a more normal angle with respect to the touch sensing device surface, thereby slowing down the rate of channel change.

In some circumstances it may be desirable to provide accurate ability to reduce the rate of a target operation. Accordingly, in various embodiments a touch controlled device may set the rate of a target function in inverse proportion to contact area in a touch sensing device. In other words, the force determining module 308 may be arranged to send instructions to decrease the rate of a target operation in response to an increase in detected contact area. Thus, a user may perform a finger roll to decrease a target operation rate.

Figure 9A:
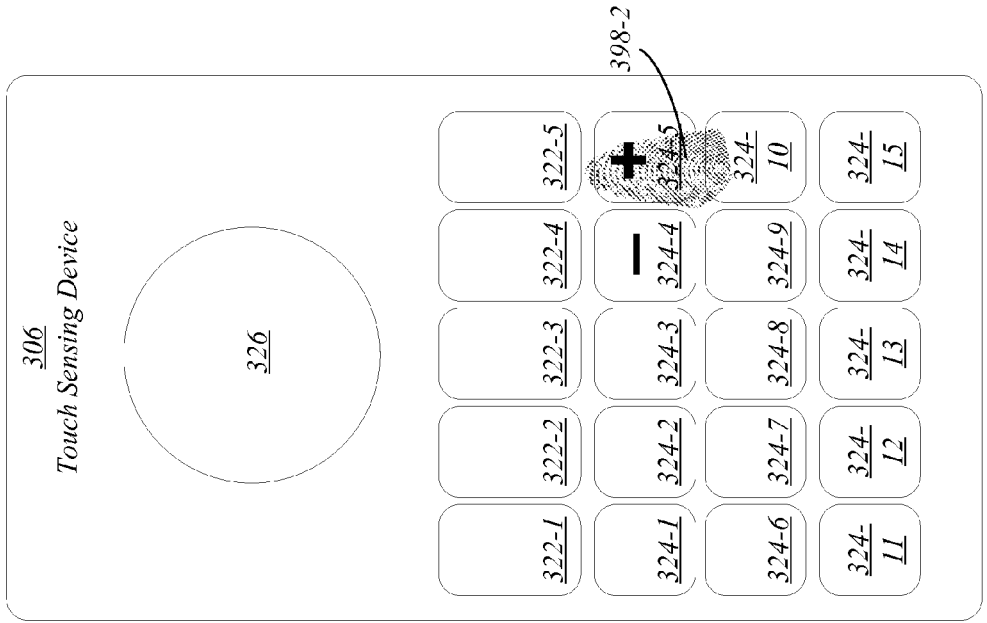
FIGS. 9a and 9b depict an embodiment of touch sensing device.
Figure 9B:
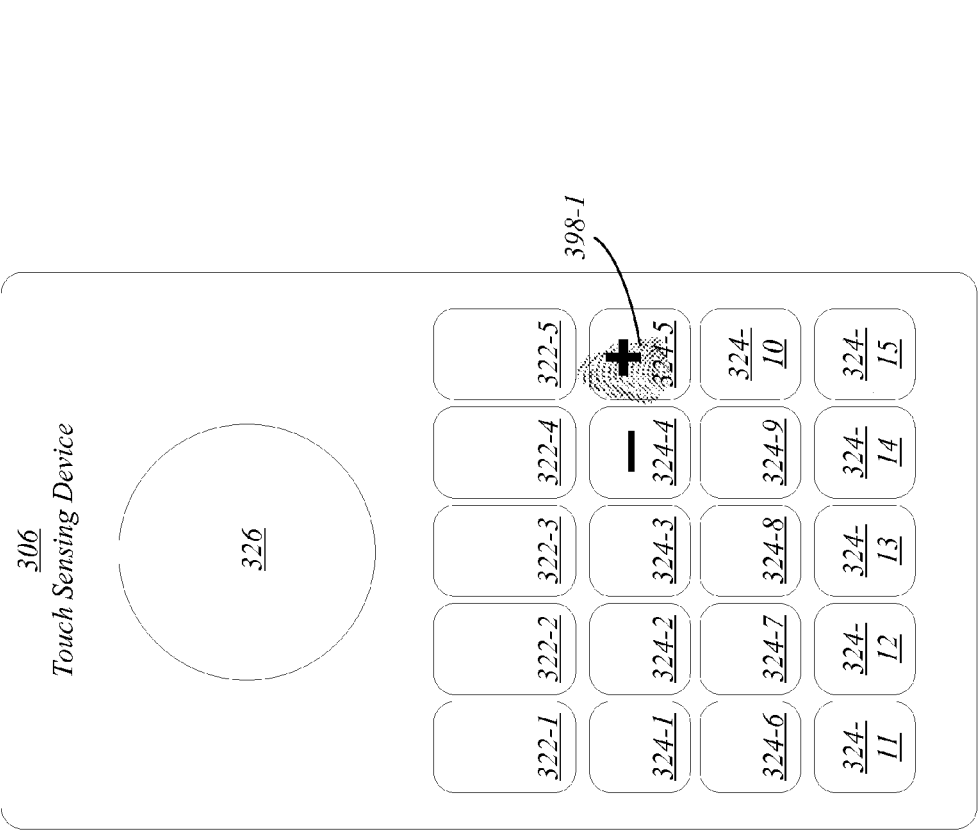

In various embodiments, a touch screen may provide multiple regions that each can be controlled according to changes in contact area within a given region. In some embodiments, the different regions may vary in shape, size, and overall appearance. FIGS. 9a and 9b depict an embodiment of touch sensing device 306, which may be a touch screen, touch pad, or combination of the two in various implementations. As depicted, touch sensing device 306 may include a set of regions 322 and 324 that are provided in a keypad-type layout. In various embodiments, these regions 322, 324 may, but need not, be visually delineated on a surface of the touch sensing device. In some embodiments within one or more of the regions 322, 324 icons may be provided that denote the operation(s) that may be triggered by touching that region. For example, in some embodiments, the icons may represent a virtual keypad typical of a telephone device, Smartphone, PDA, tablet computer, or remote control device, among other possibilities. As illustrated, the regions 322 may be larger than the regions 324 in a manner that emulates a typical physical keypad that may have buttons or similar devices that vary in size. Touch sensing device 306 may also include a larger region 326 that may providing the pointing, selection, and other functionality of a touch pad device. In some embodiments, a user may control a pointer such as a cursor by movement of a finger on the surface of region 326. When a function, such as a scroll function, is selected by the pointer, a user may control the scroll rate by varying the area of contact of the finger in region 326. In various embodiments, the size of each of regions 322, 324, and 326 may be provided to facilitate placement of fingertips within a designated region.

However, in some embodiments the contact area for a given contact event associated with a target operation may extend beyond visually delineated borders that may be provided on a touch screen. Thus, if a user selects a "channel increase" function (designated by a "+" icon) by pressing the touch sensing device in the vicinity of region 324-5 (FIG. 9a), the touch controlled device (not shown) that contains touch sensing device 306 may determine that a channel increase function has been selected by the detected position of the initial contact portion 398-1, which may be located predominantly within region 324-5. The rate of channel change may subsequently be increased by rolling the finger to create a larger portion 398-2 that contacts the touch sensing device 306. Even though the portion 398-2 extends beyond region 324-5, the total area of the portion 398-2 may be used to determine a channel change rate because the touch controlled device knows that the signals detected within portion 398-2 correspond to the same contact event, that is, a "channel increase" selection.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
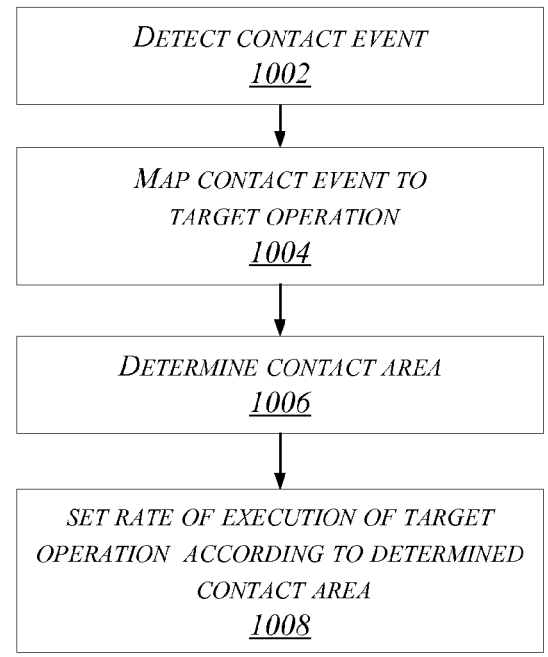
FIG. 10 depicts one exemplary logic flow.

FIG. 10 depicts one exemplary logic flow 1000. At block 1002, a contact event is detected. In some embodiments, the contact event may be detected using a touch pad, touch screen or similar device. In various embodiments, an event may be determined to be a contact event when the level of signals produced by the event exceeds a threshold. At block 1004, the contact event is mapped to a target operation. For example, the target operation may be determined by a pair of x-y coordinates on a touch screen that define the location at which the contact event is detected. At block 1006 a contact area produced by the contact event is determined. In various embodiments, the location and contact area of a contact event may be provided as "x," "y," and "z" scalars that specify the touch screen or touch pad location (x,y) and thereby the target operation, as well as the calculated area (z), and thereby a rate at which the operation is to be performed. At block 1006, a rate of execution of the target operation is set according to the determined contact area.

Figure 11:
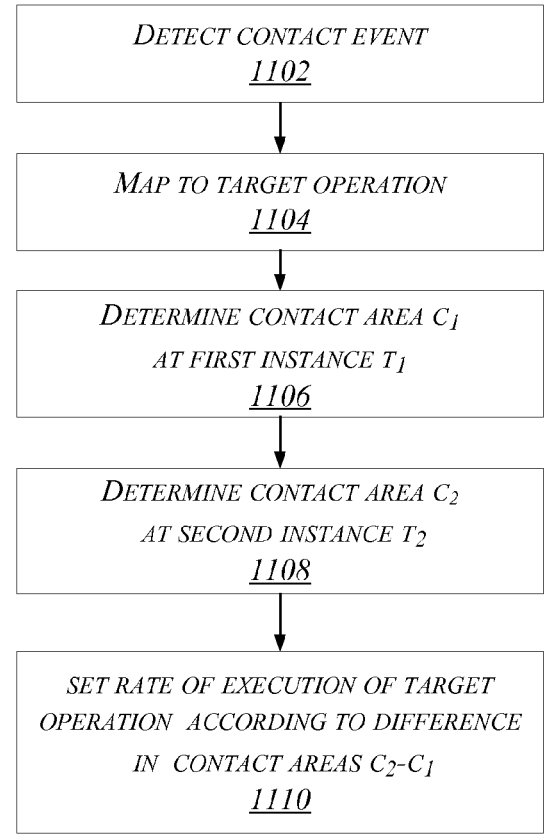
FIG. 11 depicts another exemplary logic flow.

FIG. 11 illustrates another exemplary logic flow 1100. At block 1102 a contact event is detected. At block 1104 the contact event is mapped to a particular target operation. At block 1106 a first contact area $C_1$ associated with the detected contact event is determined at a time $T_1$. In some embodiments, this first contact area may be calculated after a predetermined interval from when signals corresponding to the detected contact event exceed a threshold. At block 1108 a second contact area $C_2$ associated with the detected contact event is determined at a time $T_2$. At block 1110, the rate of execution of the target operation is set according to a difference $C_2-C_1$.

Figure 12:
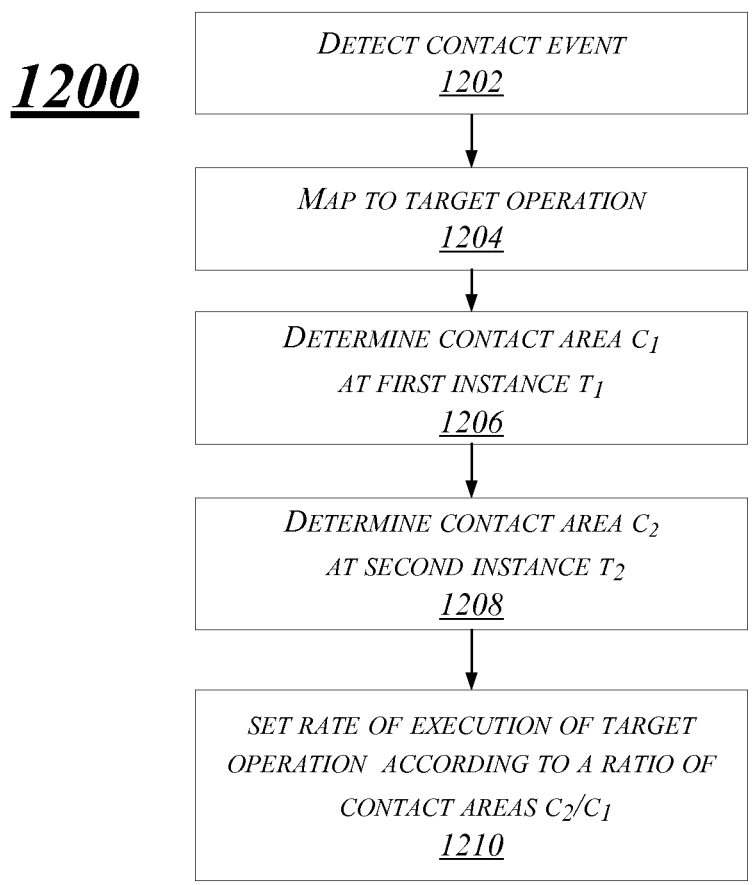
FIG. 12 depicts still another exemplary logic flow.

FIG. 12 depicts another exemplary logic flow 1200. At block 1202 a contact event is detected. At block 1204 the contact event is mapped to a particular target operation. At block 1206 a first contact area $C_1$ associated with the detected contact event is determined at a time $T_1$. At block 1208 a second contact area $C_2$ associated with the detected contact event is determined at a time $T_2$. At block 1210, the rate of execution of the target operation is set according to a ratio of $C_2/C_1$.

Figure 13:
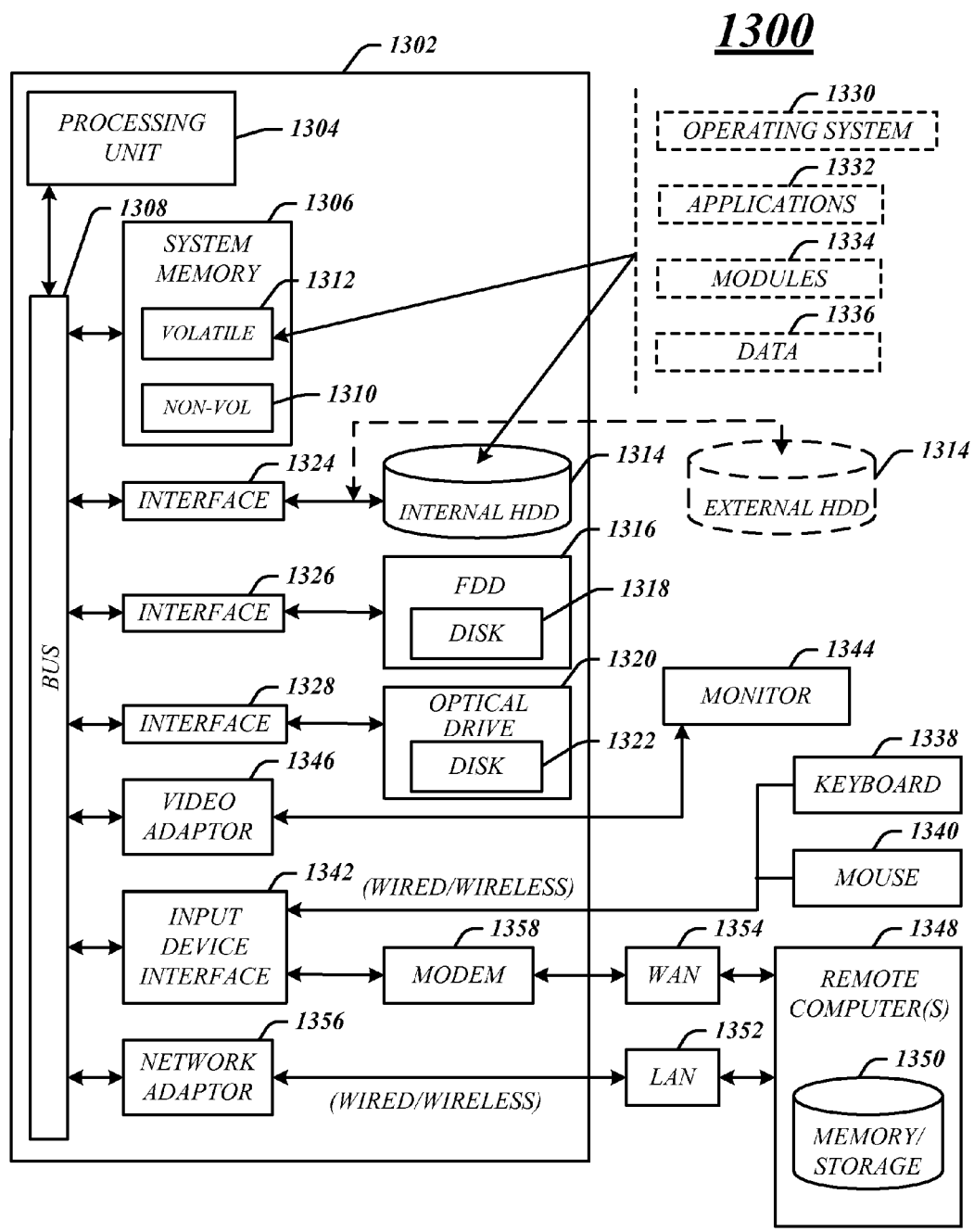
FIG. 13 illustrates one embodiment of a computing architecture.

FIG. 13 illustrates an embodiment of an exemplary computing architecture 1300 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
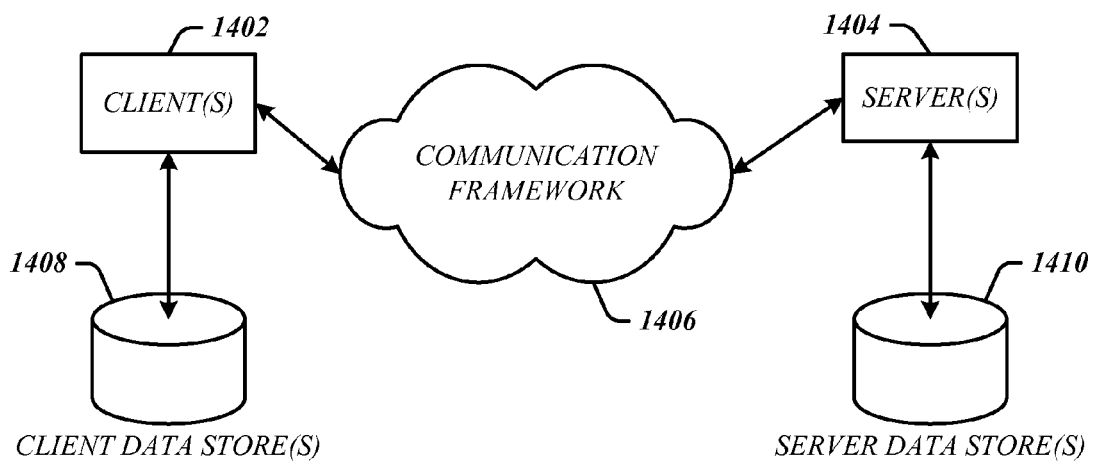
FIG. 14 illustrates one embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, and so forth. The embodiments, however, are not limited to implementation by the communications architecture 1400.

As shown in FIG. 14, the communications architecture 1400 comprises includes one or more clients 1402 and servers 1404. The clients 1402 may implement the client systems 310, 400. The servers 1404 may implement the server system 330. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols, such as those described with reference to system 1300. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor;
   a touch sensing device coupled to the processor;
   a force determining module operative on the processor to:
      receive a detection signal from a first portion of the touch sensing device;
      determine a first contact area of the first portion at a first instance based upon the detection signal;
      map the first portion to a target operation;
      determine a second contact area at a second instance;
      determine a difference in the first and second contact areas; and
      send control instructions to perform the target operation based on the determined first contact area and at an operation rate proportional to a difference in the first and second contact areas.

2. The apparatus of claim 1, the control instructions to set the operation rate for performing the target operation in inverse proportion to the first and second determined contact areas.

3. The apparatus of claim 1, the second contact area being larger than the first contact area, the force determining module arranged to:
   send control instructions to perform the target operation at the operation rate proportional to a ratio of the second contact area to the first contact area.

4. The apparatus of claim 1, the force determining module arranged to:
   determine that a contact event has occurred at the first instance when the detection signal exceeds a threshold;
   determine a baseline contact area at a first interval after the first instance; and
   send control instructions to perform the target operation at the operation rate based on comparing the second contact area to the baseline contact area.

5. The apparatus of claim 1, the touch sensing device comprising a two dimensional array of sensors, the force determining module arranged to determine the first contact area from a multiplicity of signals received from the two dimensional array of sensors.

6. The apparatus of claim 1, the apparatus comprising a digital display that includes the touch sensing device, the control instructions to control a zoom rate in the digital display in proportion to the first or second contact areas.

7. The apparatus of claim 1, the apparatus comprising a digital display that includes the touch sensing device, the control instructions to control a scrolling rate in the digital display in proportion to the first or second contact areas.

8. The apparatus of claim 1, the apparatus comprising a transmitter to send the control instructions to a media device, the control instructions to control a rate of change of audio volume in the media device in proportion to the first or second contact areas.

9. The apparatus of claim 1, the apparatus comprising a transmitter to send the control instructions to a media device, the control instructions to control a channel change rate in the media device in proportion to the first or second contact areas.

10. The apparatus of claim 1, the touch sensing device comprising a capacitive touch device, a surface acoustic wave device, or an optically measured touch device.

11. An article comprising a non-transitory computer-readable storage medium containing instructions that when executed by a processor enable a system to:
receive a signal indicating a contact event in a first portion of a touch sensing device;
map the first portion to a target operation;
determine a first contact area of the contact event at a first instance;
determine a second contact area at a second instance;
determine a difference in the first and second contact areas; and
send control instructions to perform the target operation at an operation rate based upon the determined first contact area and at an operation rate proportional to a difference in the first and second contact areas.

12. The article of claim 11, containing instructions that when executed by a processor enable a system to send control instructions setting the operation rate in inverse proportion to the determined first and second contact areas.

13. The article of claim 11, the second contact area being larger than the first contact area, the non-transitory computer-readable medium containing instructions that when executed by a processor enable a system to:
send control instructions to perform the target operation at the operation rate proportional to a ratio of the second contact area to the first contact area.

14. The article of claim 11, containing instructions that when executed by a processor enable a system to:
determine that a contact event has occurred at the first instance when the detection signal exceeds a threshold;
determine the first contact area at a first interval after the first instance;
assign the first contact area as a baseline contact area; and
send control instructions to perform the target operation at an operation rate based on comparing the second contact area to the baseline contact area.

15. The article of claim 11, containing instructions that when executed by a processor enable a system to:
assign an x and a y value of the first contact area that specify a position of the first portion in a two dimensional coordinate system;
assign a z value to the second contact area; and
provide the x, y, and z values as control instructions that define the target operation and the operation rate.

16. The article of claim 11, containing instructions that when executed by a processor enable a system to send control instructions to control a channel change rate or a rate of change of audio volume in proportion to the determined first and second contact areas.

17. The article of claim 11, containing instructions that when executed by a processor enable a system to send control instructions to control a scrolling rate or a zoom rate in proportion to the determined first and second contact areas.

18. The article of claim 11 comprising instructions that when executed by a processor enable a system to set the operation rate to be inversely proportional to one of:
a difference between the first and the second contact areas; and
a ratio of the second to the first contact areas.

19. A method, comprising:
detecting a signal at a first instance that exceeds a threshold in a first portion of a touch sensing device;
determining a first contact area associated with the signal at a first interval after the first instance;
determining a second contact area at a second instance, the second contact area being greater than the first contact area;
comparing the first and second contact areas;
mapping the first portion to a target operation;
determining a first operation rate based on a difference between the first and the second contact areas or based on a proportional ratio of the first and second contact area; and
sending control instructions to perform the target operation at the first operation rate in accordance with the comparison.

20. The method of claim 19, comprising:
assigning an x and a y value of the first contact area that specify a position of the first portion in a two dimensional coordinate system;
assigning a z value to the second contact area; and
providing the x, y, and z values as control instructions that define the target operation and the operation rate.

21. The method of claim 19, comprising sending control instructions to set a zoom rate or a scrolling rate in a display portion of the touch sensing device, the respective zoom rate or scrolling rate set in proportion to a difference in the first and second contact area.

22. The method of claim 19, comprising sending control instructions to set a channel change rate or a rate of change of audio volume, the respective channel change rate or the rate of change of audio volume set in proportion to a difference in the first and second contact area.

23. The method of claim 19, comprising setting the operation rate to be inversely proportional to a difference between the first and second contact areas or a ratio of the second contact area to the first contact area.

24. The method of claim 19, comprising:
determining a third contact area at a third instance, the third contact area being smaller than the first second contact area;
comparing the third contact area and the first contact area; and
sending control instructions to perform the target operation at a second operation rate that is lower than the first operation rate in accordance with the comparison.

* * * * *